United States Patent
Nago

(10) Patent No.: US 8,336,680 B2
(45) Date of Patent: Dec. 25, 2012

(54) CENTER-PULL BICYCLE BRAKE WITH SYNCHRONIZED BRAKE ARMS

(75) Inventor: Daisuke Nago, Sakai (JP)

(73) Assignee: Shimano, Inc., Sakai (JP)

( * ) Notice: Subject to any disclaimer, the term of this patent is extended or adjusted under 35 U.S.C. 154(b) by 75 days.

(21) Appl. No.: 13/040,930

(22) Filed: Mar. 4, 2011

(65) Prior Publication Data

US 2012/0222919 A1    Sep. 6, 2012

(51) Int. Cl.
*B62L 1/06* (2006.01)
(52) U.S. Cl. ................................. 188/24.12; 188/24.22
(58) Field of Classification Search ............... 188/24.11, 188/24.12, 24.19, 24.21, 24.22
See application file for complete search history.

(56) References Cited

U.S. PATENT DOCUMENTS

| | | | | |
|---|---|---|---|---|
| 5,960,913 A | * | 10/1999 | Kuo | 188/24.19 |
| 6,155,383 A | * | 12/2000 | Sugimoto | 188/24.12 |
| 8,061,487 B2 | * | 11/2011 | Tsai | 188/24.12 |
| 8,096,392 B2 | * | 1/2012 | Edwards et al. | 188/24.12 |
| 2006/0113151 A1 | * | 6/2006 | Tsai | 188/24.12 |

FOREIGN PATENT DOCUMENTS

| | | |
|---|---|---|
| JP | 62-177592 U | 11/1987 |
| JP | 63-112995 U | 7/1988 |
| JP | 64-90890 A | 4/1989 |
| JP | 64-90891 A | 4/1989 |

* cited by examiner

*Primary Examiner* — Christopher Schwartz
(74) *Attorney, Agent, or Firm* — James A. Deland

(57) ABSTRACT

A bicycle brake device includes first and second brake arms. The first brake arm includes a first brake arm mounting portion for mounting the first brake arm to a bicycle frame member, a first brake pad mounting portion, and a first control interface portion. Similarly, the second brake arm includes a second brake arm mounting portion for mounting the second brake arm to the bicycle frame member, a second brake pad mounting portion, and a second control interface portion. A biasing member is operatively coupled to the first brake arm so that the first brake pad mounting portion is biased in a selected direction. A bias communicating member is operatively coupled between the first brake arm and the second brake arm to communicate biasing force from the biasing member to the second brake arm.

20 Claims, 6 Drawing Sheets

CENTER-PULL BICYCLE BRAKE WITH SYNCHRONIZED BRAKE ARMS

BACKGROUND OF THE INVENTION

The present invention is directed to bicycle brakes and, more particularly, to a center-pull style bicycle brake with synchronized brake arms.

Typical center-pull bicycle brakes comprise first and second brake arms pivotably mounted to a bicycle frame member such as front fork or rear seat stay of the bicycle frame. Each brake arm includes a brake arm mounting portion for mounting the brake arm to the bicycle frame member, a brake pad mounting portion, and a control interface portion. The brake arm mounting portion is disposed between the brake pad mounting portion and the control interface portion such that the brake pad mounting portion is disposed below the brake arm mounting portion when the brake arm is mounted to the bicycle frame member. When the first and second brake arms are mounted to the bicycle frame member, the control interface portion of the first brake arm extends to the side of the bicycle frame member at which the second brake arm is mounted, and vice versa. First and second return springs usually are mounted between the respective first and second brake arm mounting portions and the bicycle frame member for biasing the first and second brake pad mounting portions away from the bicycle wheel rim.

After the first and second brake arms are mounted to the bicycle frame member, an intermediate control element such as a control wire is mounted to the first control interface portion of the first brake arm and to the second control interface portion of the second brake arm. A primary control element then is mounted to the center of the intermediate control element such that, when the primary control element is pulled upwardly, the first and second brake arms rotate against the biasing forces of the first and second return springs so that first and second brake pads mounted to the first and second brake pad mounting portions frictionally contact the bicycle wheel rim.

The friction caused by the structures used to mount the first and second brake arm mounting portions to the bicycle frame member sometimes is not equally balanced between the first and second brake arms. As a result, the rotation of the first and second brake arms is not properly synchronized, so the first and second brake pads do not contact the bicycle rim at the same time. Several attempts have been made to solve this synchronization problem. For example, JP 62-177592 discloses first and second gear wheels that engage gear teeth on the first and second brake arms to synchronously push the control interface portions of the first and second brake arms apart during operation of the brake; JP 63-112995 discloses first and second rollers respectively mounted to the first and second control interface portions of the first and second brake arms, wherein a cam mounted to the primary control element contacts the first and second rollers to synchronously push the first and second control interface portions of the first and second brake arms apart when the primary control element is pulled upwardly; JP 64-90890 discloses a pair of links with attached rollers that are pushed apart by a cam mounted to the primary control element, wherein the rollers synchronously push the first and second control interface portions of the first and second brake arms apart when the primary control element is pulled upwardly; JP 64-90891 discloses multiple links connected both in series and in parallel to the first and second brake arms and to the primary control element to synchronously push the first and second control interface portions of the first and second brake arms apart when the primary control element is pulled upwardly. However, such complicated structures add more friction and operating effort to the braking device, which only gets worse when the synchronizing assemblies are subjected to water, dirt, mud and other contaminants.

Another disadvantage of prior art braking systems is that the biasing forces of the return springs must be overcome by the rider in order to operate the brakes. When synchronizing structures are used to synchronize the operation of the first and second brake arms, stronger return springs must be used to generate the greater biasing forces needed to overcome the additional friction created by the synchronizing structures and rotate the first and second brake arms so that the first and second brake pads are separated from the wheel rim. Such additional biasing forces further increase the effort required by the rider to operate the brakes.

SUMMARY OF THE INVENTION

The present invention is directed to various features of a bicycle brake device. In one embodiment, a bicycle brake apparatus includes first and second brake arms. The first brake arm includes a first brake arm mounting portion for mounting the first brake arm to a bicycle frame member, a first brake pad mounting portion, and a first control interface portion. Similarly, the second brake arm includes a second brake arm mounting portion for mounting the second brake arm to the bicycle frame member, a second brake pad mounting portion, and a second control interface portion. A biasing member is operatively coupled to the first brake arm so that the first brake pad mounting portion is biased in a selected direction. A bias communicating member is operatively coupled between the first brake arm and the second brake arm to communicate biasing force from the biasing member to the second brake arm. Additional inventive features will become apparent from the description below, and such features alone or in combination with the above features and their equivalents may form the basis of further inventions as recited in the claims.

DETAILED DESCRIPTION OF THE EMBODIMENTS

Figure 1:
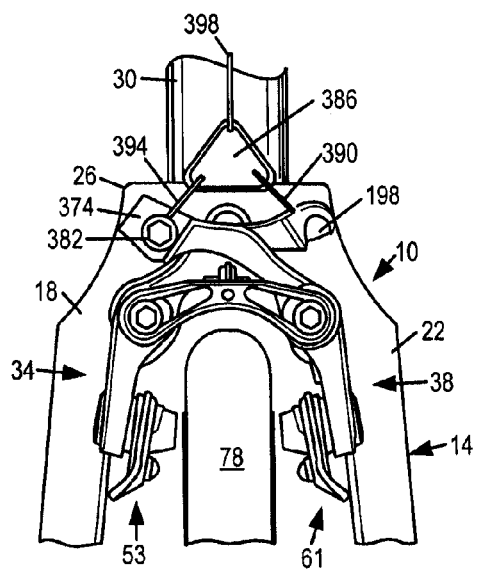
FIG. 1 is a front view of an embodiment of a bicycle brake device attached to a front fork of a bicycle.
Figure 2:
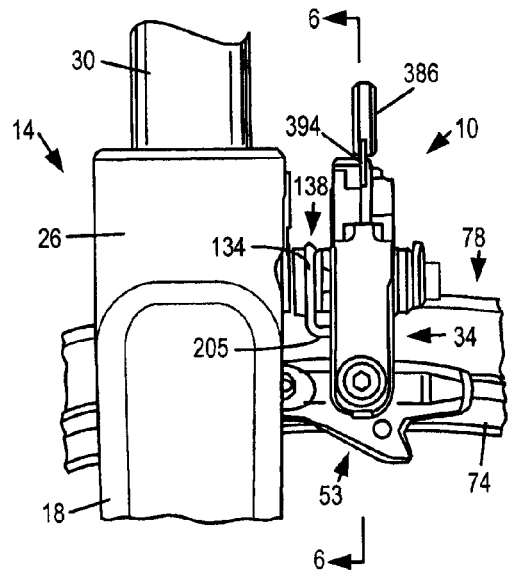
FIG. 2 is a right side view of the bicycle brake device.
Figure 3:
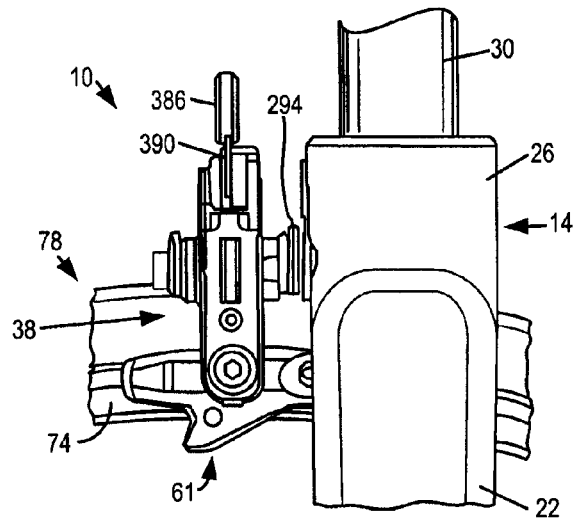
FIG. 3 is a left side view of the bicycle brake device.

FIG. 1 is a front view of an embodiment of a bicycle brake device 10 attached to a front fork 14 of a bicycle, FIG. 2 is a right side view of bicycle brake device 10, and FIG. 3 is a left side view of bicycle brake device 10. Front fork 14 has a typical structure wherein a first fork leg 18 and a second fork leg 22 extend downwardly from a bridging member 26 that is attached to a steering tube 30. Brake device 10 includes a first brake arm 34 and a second brake arm 38, wherein first brake arm 34 is rotatably mounted to first fork leg 18 and second brake arm 38 is rotatably mounted to second fork leg 22. As shown more clearly in FIG. 4, first brake arm 34 includes a first brake arm mounting portion 42 for mounting first brake arm 34 to first fork leg 18, a first brake pad mounting portion 46 and a first control interface portion such as a first control element attachment location such as a first cable mounting portion 50. First brake pad mounting portion 46 has a first brake pad mounting opening 52 for mounting a first brake pad 53 (FIG. 1) in a well-known manner. Similarly, second brake arm 38 includes a second brake arm mounting portion 54 for mounting second brake arm 38 to second fork leg 22, a second brake pad mounting portion 58 and a control interface portion such as a second control element attachment location such as a second cable mounting portion 62. Second brake pad mounting portion 58 has a second brake pad mounting opening 60 for mounting a second brake pad 61 in a well-known manner. As shown in FIGS. 1-3, first brake pad 53 and second brake pad 61 are adapted to frictionally contact a rim portion 74 of a wheel 78.

First brake arm mounting portion 42 includes a first mounting opening 66 for receiving a first mounting assembly 70 therethrough. First mounting assembly 70 includes a tubular first mounting base 82, nuts 86, 90, a tubular first bushing 94, a washer 98, a spacer 102, a washer 106, a tubular first pivot axle 110, and a first mounting bolt 114. First mounting base 82 includes a first mounting flange 118, a first spring mounting portion 122, a first bushing mounting portion 126 and a first threaded opening 130. First mounting flange 118 is structured to be welded or otherwise attached to first fork leg 18. First spring mounting portion 122 is structured to extend through a coil 134 of a biasing member such as a return spring 138, and first bushing mounting portion 126 is structured to be inserted into an opening 142 in first bushing 94. First bushing 94 includes a first flange 146 and a first arm mounting portion 150, wherein first flange 146 abuts against nut 90, and first arm mounting portion 150 extends through first mounting opening 66 in first brake arm mounting portion 42.

First pivot axle 110 includes a first tubular portion 154, a first flange 158, and a first gate bridge supporting portion 162. First tubular portion 154 extends through washer 106, spacer 102, washer 98, first arm mounting portion 150 of first bushing 94, and nuts 86 and 90 until first flange 158 abuts against washer 106. A gate bridge 166 includes a first gate bridge loop 170 and a second gate bridge loop 174, wherein first gate bridge loop 170 is structured to receive first gate bridge supporting portion 162 of first pivot axle 110 therein so that first gate bridge loop 170 abuts against first flange 158 of first pivot axle 110. First mounting bolt 114 extends through first pivot axle 110 and screws into first threaded opening 130 in first mounting base 82 to axially fix first brake arm 34 to first fork leg 18 so that first brake arm 34 is supported by first bushing 94 for rotation around a first pivot axis X1.

The upper portion of first brake arm 34 bends laterally inwardly from first brake arm mounting portion 42 and forms first cable mounting portion 50 at a distal end thereof. First cable mounting portion 50 includes plate-shaped, parallel and arcuate first and second end bead mounting claws 182 and 186 that form a substantially vertically-oriented cable receiving slot 190 therebetween. First end bead mounting claw 182 forms a first cable end bead receiving opening 194 for receiving a cable end bead 198 (FIG. 1) therein, and second end bead mounting claw 186 forms a second cable end bead receiving opening 202 for receiving cable end bead 198 therein.

A spring contacting surface 204 is formed on the laterally inner side surface of first brake arm 34 between first brake arm mounting portion 42 and first brake pad mounting portion 46 for contacting a first spring end 205 of return spring 138. A pair of parallel, spaced-apart roller mounting ears 206 and 210 with corresponding mounting openings 214 and 218 are disposed on first brake arm 34 between first brake arm mounting portion 42 and first cable mounting portion 50. Mounting opening 214 is unthreaded, whereas mounting opening 218 is threaded. Mounting ears 206 and 210 are spaced apart for receiving a tubular spacer 222 and a tubular roller 226 therebetween. Roller 226 is rotatably mounted between roller mounting ears 206 and 210 by a screw 230 that extends through mounting ear 206 and spacer 222 and screws into threaded mounting opening 218. Roller 226 functions as a movement interface member in a manner discussed below.

Second brake arm mounting portion 54 includes a second mounting opening 234 for receiving a second mounting assembly 238 therethrough. Second mounting assembly 238 is substantially the same as first mounting assembly 70. Second mounting assembly 238 includes a tubular second mounting base 242, nuts 246, 250, a tubular second bushing 254, a washer 258, a spacer 262, a washer 266, a tubular second pivot axle 270, and a second mounting bolt 274. Second mounting base 242 includes a second mounting flange 278, a second spring mounting portion 282, a second bushing mounting portion 286 and a second threaded opening 290. Second mounting flange 278 is structured to be welded or otherwise attached to second fork leg 22. Second spring mounting portion 282 is structured to engage a second spring end 294 of return spring 138, and second bushing mounting portion 286 is structured to be inserted into an opening 298 in second bushing 254. Second bushing 254 includes a second flange 302 and a second arm mounting portion 306, wherein second flange 302 abuts against nut 250, and second arm mounting portion 306 extends through second mounting opening 234 in second brake arm mounting portion 54.

Second pivot axle 270 includes a second tubular portion 310, a second flange 314, and a second gate bridge supporting portion 318. Second tubular portion 310 extends through washer 266, spacer 262, washer 258, second arm mounting portion 306 of second bushing 254, and nuts 246 and 250 until second flange 314 abuts against washer 266. Second gate bridge loop 174 of gate bridge 166 is structured to receive second gate bridge supporting portion 318 of second pivot axle 270 therein so that second gate bridge loop 174 abuts against second flange 314. Second mounting bolt 274 extends through second pivot axle 270 and screws into second threaded opening 290 in second mounting base 242 to axially fix second brake arm 38 to second fork leg 22 so that second brake arm 38 is supported by second bushing 254 for rotation around a second pivot axis X2.

Figure 4:
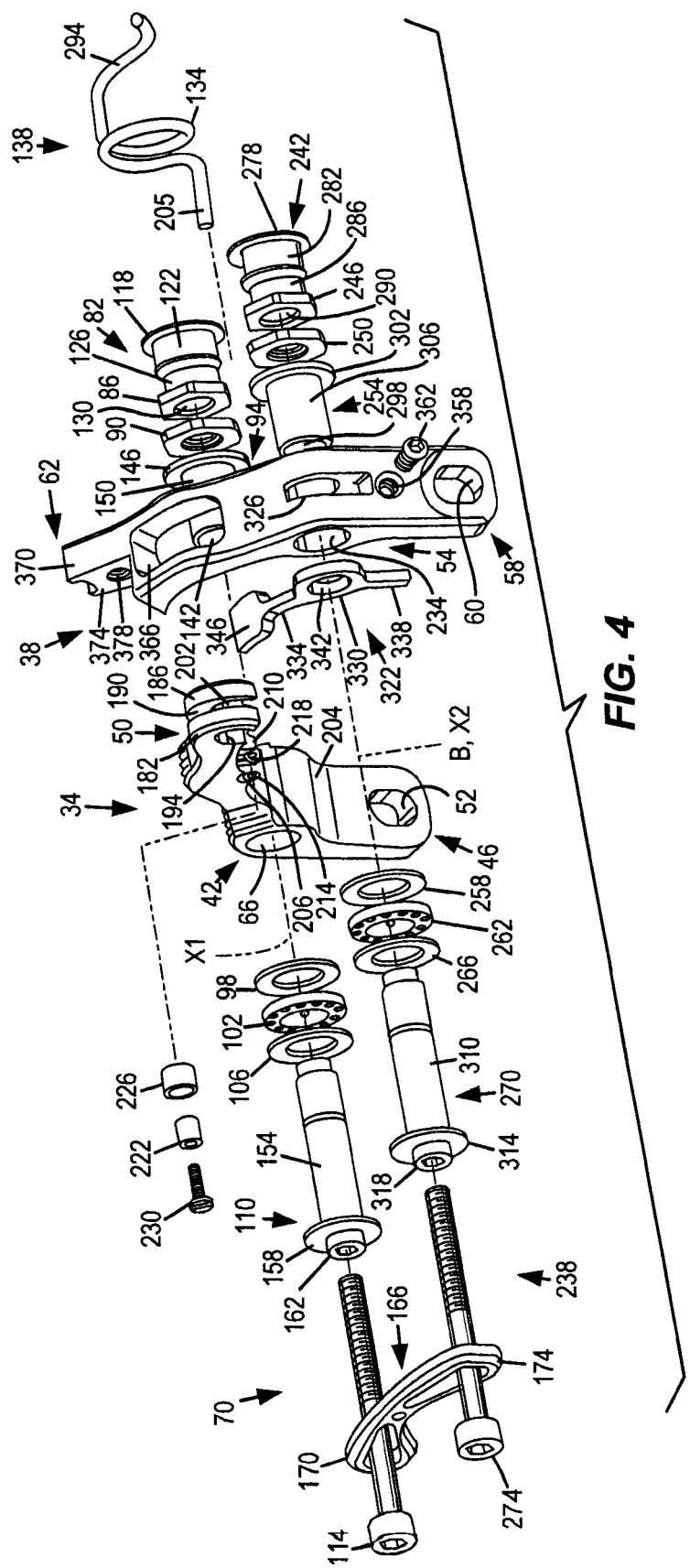
FIG. 4 is an exploded perspective view of the bicycle brake device.
Figure 5:
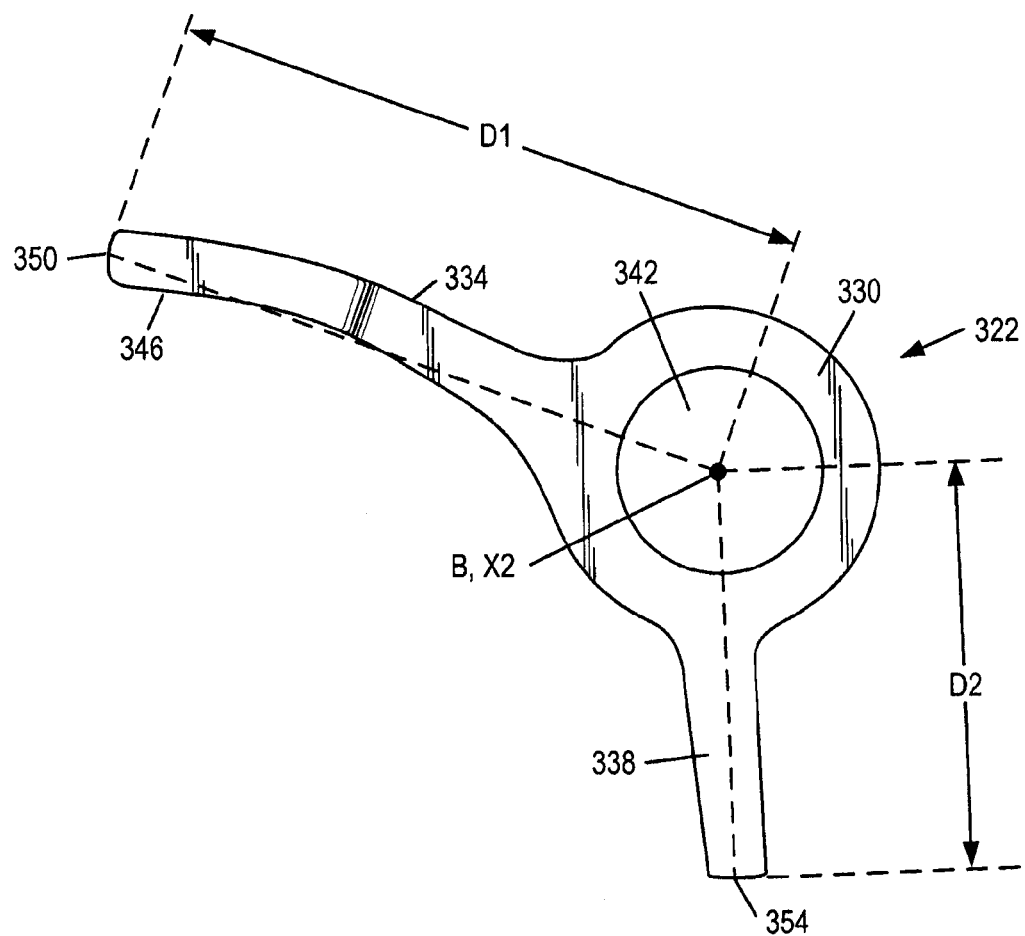
FIG. 5 is a front view of a bias communicating member.

A bias communicating member 322 is structured and dimensioned to be mounted within a vertical mounting groove 326 formed in second brake arm mounting portion 54 of second brake arm 38. In this embodiment, second pivot axis X2 intersects mounting groove 326 so that bias communicating member 322 pivots around a bias communicating member pivot axis B that is coaxial with second pivot axis X2. As shown in FIGS. 4 and 5, bias communicating member 322 comprises a bias communicating member mounting portion 330, a first brake arm interface portion 334, and an axially thin, rod-shaped second brake arm interface portion 338, wherein bias communicating member mounting portion 330 is disposed between first brake arm interface portion 334 and second brake arm interface portion 338. As a result, second brake arm interface portion 338 is disposed between second brake arm mounting portion 54 and second brake pad mounting portion 58 of second brake arm 38 when bias communicating member 322 is mounted in mounting groove 326. Bias communicating member mounting portion 330 is formed as a generally annular member having an opening 342 dimensioned to receive second arm mounting portion 306 of second bushing 254 therethrough. The end portion of first brake arm interface portion 334 is formed as an axially thick paddle 346 for engaging roller 226 mounted to first brake arm 34. As shown in FIG. 5, first brake arm interface portion has 334 a first brake arm interface end 350, and second brake arm interface portion 338 has a second brake arm interface end 354. A distance D1 from bias communicating member pivot axis B to first brake arm interface end 350 is greater than a distance D2 from bias communicating member pivot axis B to second brake arm interface end 354.

A threaded opening 358 is formed in second brake arm 38 between second brake arm mounting portion 54 and second brake pad mounting portion 58 for receiving an adjustment member in the form of an adjustment screw 362 therein. The tip of adjustment screw 362 contacts second brake arm interface portion 338 of bias communicating member 322 for adjusting the relative position between second brake arm interface portion 338 and second brake arm 38 in a continuous manner.

A passage 366 in the form of an opening is formed in second brake arm 38 between second brake arm mounting portion 54 and second cable mounting portion 62. In this embodiment, passage 366 is formed as a substantially circumferentially-closed opening such as a completely circumferentially-closed opening. Passage 366 is dimensioned such that it is capable of receiving the portion of first brake arm 34 above first brake arm mounting portion 42 therethrough. As a result, when brake device 10 is viewed along first pivot axis X1 and second pivot axis X2, first brake arm 34 intersects second brake arm 38 so that first cable mounting portion 50 of first brake arm 34 and second cable mounting portion 62 of second brake arm 38 are located on opposite sides of the intersection.

Second cable mounting portion 62 of second brake arm 38 extends upwardly from passage 366 and includes a cable mounting wall 370 with a side surface 374, wherein a generally horizontally-oriented threaded opening 378 is formed at side surface 374 for receiving a cable mounting bolt 382 (FIG. 1) therein. First cable mounting portion 50 and second cable mounting portion 62 are configured such that, when brake device 10 is viewed perpendicular to first and second pivot axes X1 and X2 and first and second pivot axes X1 and X2 are horizontal, cable receiving slot 190 in first brake arm 34 substantially aligns with side surface 374 on second brake arm 38.

As shown in FIGS. 1-3, in this embodiment, an intermediate control element comprises a generally triangular control plate 386, a first intermediate control wire 390, and a second intermediate control wire 394. First intermediate control wire 390 has a first end attached to the lower right vertex of control plate 386 and a second end that extends through cable receiving slot 190 in first cable mounting portion 50 of first brake arm 34 and attaches to cable end bead 198. Second intermediate control wire 394 has a first end attached to the lower left vertex of control plate 386 and a second end attached to side surface 374 of second cable mounting portion 62 of second brake arm 38 by cable mounting bolt 382. A primary control element in the form of a primary control wire 398 is attached to the upper vertex of control plate 386.

Figure 6:
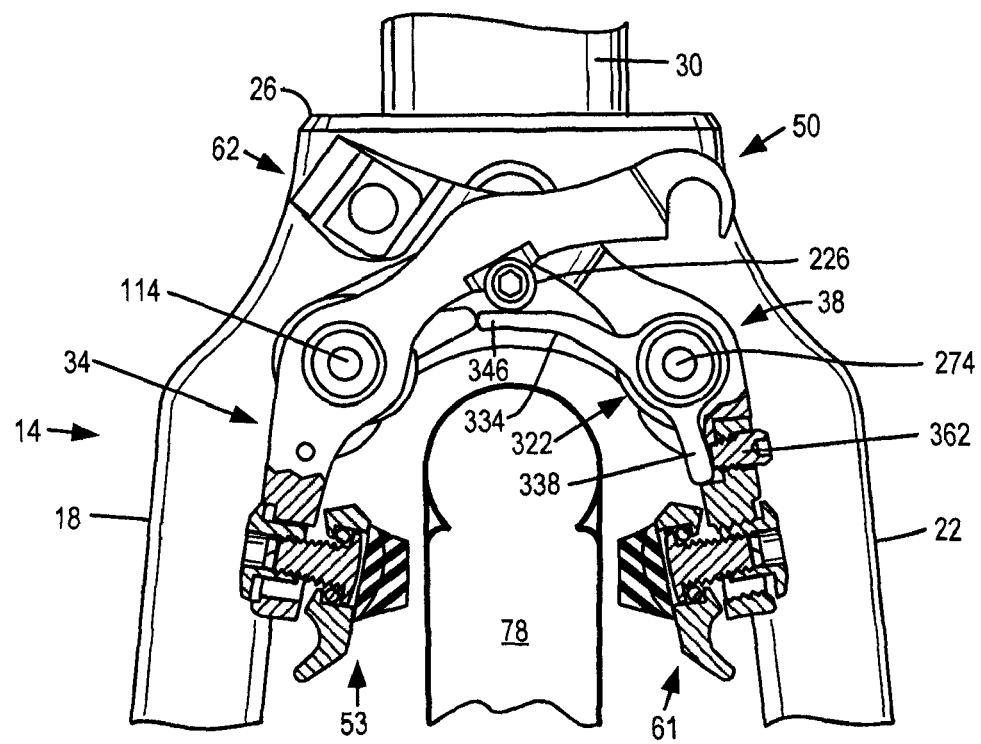
FIG. 6 is a partial cross-sectional view of the bicycle brake device in a brake-released position.
Figure 7:
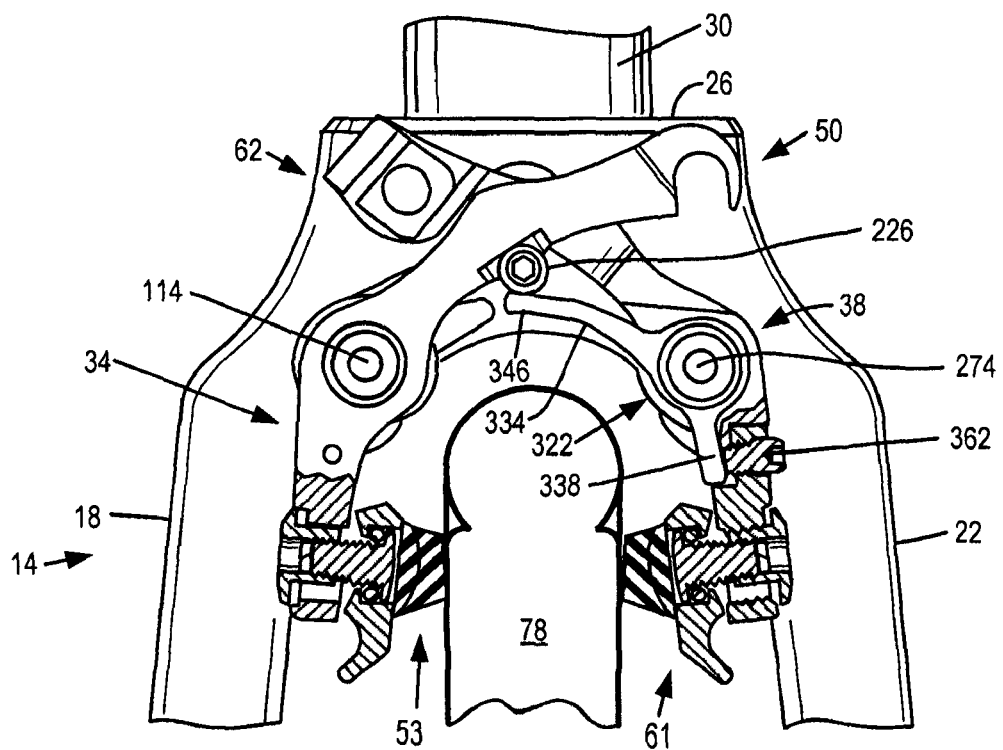
FIG. 7 is a partial cross-sectional view of the bicycle brake device in a brake-engaged position.

Operation of the device is shown in FIGS. 6 and 7, wherein FIG. 6 is a partial cross-sectional view of brake device 10 in a brake-released position, and FIG. 7 is a partial cross-sectional view of brake device 10 in a brake-engaged position. When primary control wire 398 is pulled upwardly, first cable mounting portion 50 of first brake arm 34 and second cable mounting portion 62 of second brake arm 38 are pulled upwardly, thereby causing first brake arm 34 to rotate counterclockwise and causing second brake arm 38 to rotate clockwise. During that time, the tip of adjusting screw 362 presses against second brake arm interface portion 338 of bias communicating member 322, and paddle 346 of first brake arm interface portion 334 of bias communicating member 322 presses against roller 226 attached to first brake arm 34 to synchronize the movement of first brake arm 34 and second brake arm 38. Thus, bias communicating member 322 also functions as a synchronizing member that communicates rotational force between first brake arm 34 and second brake arm 38 so that first brake arm 34 moves synchronously with second brake arm 38.

When primary control wire 398 is released, return spring 138 biases first brake arm 34 clockwise to move first brake pad 53 to the brake released position. The clockwise rotation of first brake arm 34 is communicated to paddle 346 of first brake arm interface portion 334 of bias communicating member 322 via roller 226, thereby causing bias communicating member 322 to rotate counterclockwise. The counterclockwise rotation of bias communicating member 322 is communicated to adjusting screw 362 in second brake arm 38 via second brake arm interface portion 338, thereby causing second brake arm 38 to rotate counterclockwise to move second brake pad 61 to the brake released position. Unlike prior art brake devices, only one return spring is required to rotate both first brake arm 34 and second brake arm 38 to the brake released positions. Second brake arm 38 is unbiased except for the biasing force from return spring 138 received from bias communicating member 322. As a result, less operating force is required to operate brake device 10. Furthermore, since distance D1 from bias communicating member pivot axis B to first brake arm interface end 350 is greater than a distance D2 from bias communicating member pivot axis B to second brake arm interface end 354, bias communicating member 322 functions as a lever that provides a mechanical advantage so that the biasing force of return spring 138 is efficiently communicated from first brake arm 34 to second brake arm 38. Finally, the position of first brake pad 53 relative to second brake pad 61 may be adjusted easily using adjusting screw 362 to assure symmetrical positioning of first brake pad 53 and second brake pad 61 relative to wheel 78.

Since cable receiving slot 190 in first brake arm 34 substantially axially aligns with side surface 374 on second brake arm 38 when brake device 10 is viewed perpendicular to first and second pivot axes X1 and X2, first intermediate control wire 390 likewise axially aligns with second intermediate control wire 394. As a result, the axial forces applied to first brake arm 34 and second brake arm 38 by first intermediate control wire 390 and second intermediate control wire 394 are balanced, and torsional forces applied to first intermediate control wire 390 and second intermediate control wire 394 are reduced, thereby reducing wear on the control wires. Furthermore, in this embodiment, first intermediate control wire 390 and second intermediate control wire 394 are substantially axially centered relative to first brake arm 34 and second brake arm 38 when brake device 10 is viewed perpendicular to first and second pivot axes X1 and X2. This configuration further balances the axial forces applied to first brake arm 34 and second brake arm 38.

While the above is a description of various embodiments of inventive features, further modifications may be employed without departing from the spirit and scope of the present invention. For example, bias communicating member 322 need not be mounted within mounting groove 326. Bias communicating member 322 could be mounted outside second brake arm 38, or bias communicating member 322 could be mounted on or about first brake arm 34. Other adjusting members could be provided for adjusting the relative position between second brake arm 38 and second brake arm interface portion 338 of bias communicating member 322. For example a spacer or some other member or structure could be disposed between second brake arm 38 and second brake arm interface portion 338 for adjusting the relative position between second brake arm 38 and second brake arm interface portion 338 in a discrete or step-wise manner. Passage 366 need not be formed as a bounded opening as long as passage 366 accommodates the passage of first brake arm 34 therethrough.

Figure 8:
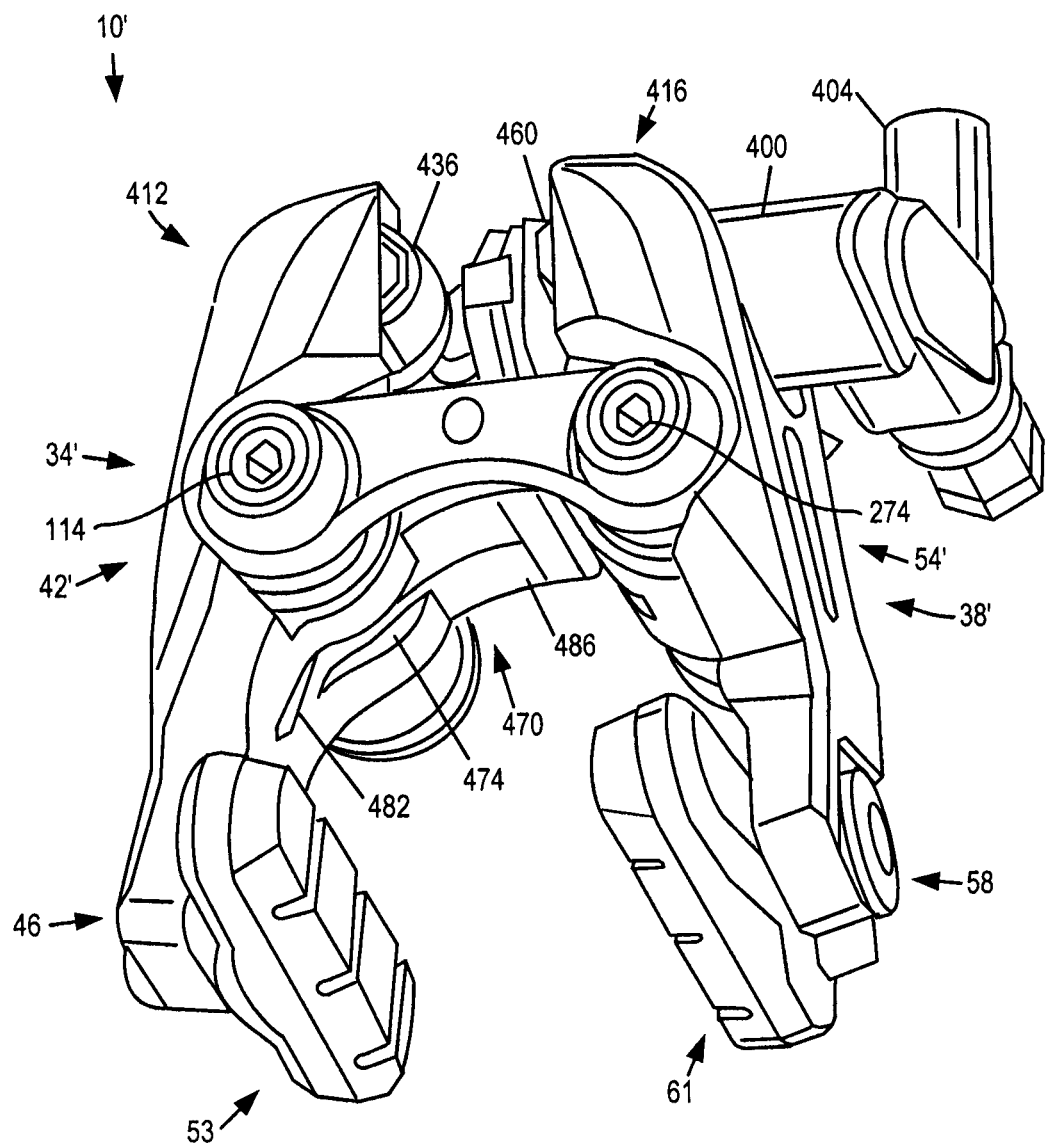
FIG. 8 is a bottom perspective view of another embodiment of a bicycle brake device.
Figure 9:
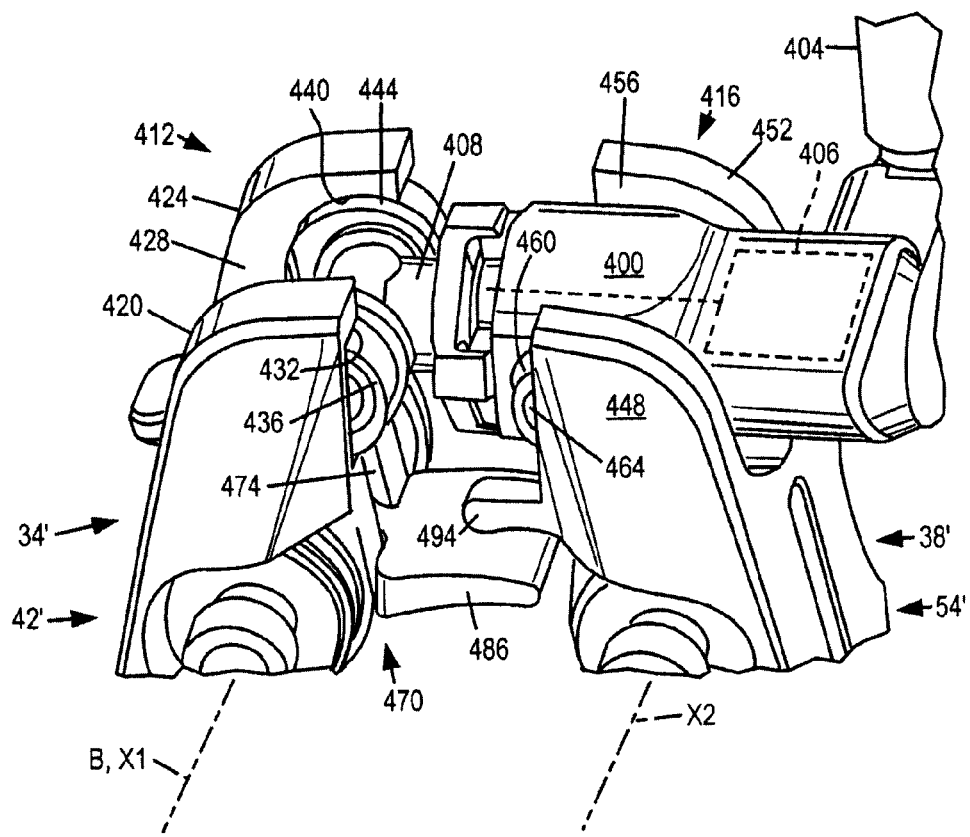
FIG. 9 is a detailed view of top portions of the bicycle brake device shown in FIG. 8.
Figure 10:
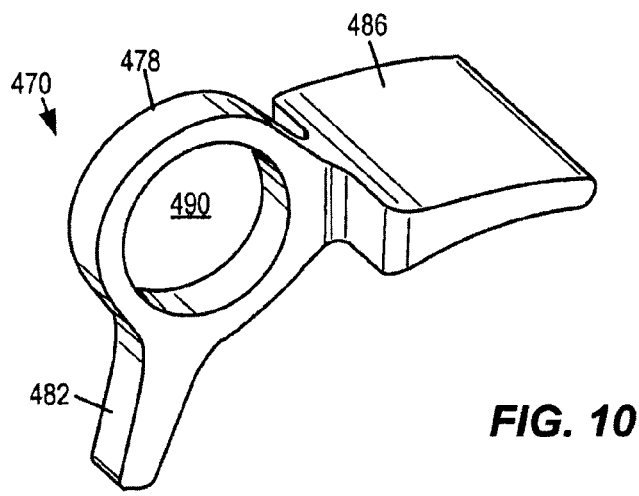
FIG. 10 is a perspective view of a bias communicating member used in the embodiments shown in FIGS. 8 and 9.

While brake device 10 was operated using primary control wire 398, control plate 386, first intermediate control wire 390 and second intermediate control wire 394, the bias communicating function and/or the synchronizing function performed by bias communicating member 322 may be applied to other braking devices. For example FIGS. 8-10 illustrate another embodiment of a brake device 10' that includes inventive features. This embodiment includes a first brake arm 34' and a second brake arm 38'. First brake arm 34' and second brake arm 38' share many features as first brake arm 34 and second brake arm 38 in the first embodiment, so only the differences will be described.

In this embodiment, first brake arm 34' and second brake arm 38' are operated by a piston-operating hydraulic cylinder 400 that receives hydraulic fluid from a hydraulic fluid line 404 and includes a piston 406 (shown schematically in FIG. 9) that selectively extends and retracts a T-shaped piston shaft 408 in response to the pressure of hydraulic fluid received through hydraulic fluid line 404. Piston shaft 408 is biased toward a retracted position by a return spring (not shown) disposed within hydraulic cylinder 400 in a well-known manner. To accommodate this structure, first brake arm 34' includes a first control interface portion 412, and second brake arm 38' includes a second control interface portion 416. First control interface portion 412 includes parallel and arcuate first and second shaft mounting claws 420 and 424 that form a substantially vertically-oriented slot 428 therebetween. First shaft mounting claw 420 forms a first cartridge bearing receiving recess 432 for receiving a first cartridge bearing 436 therein, and second shaft mounting claw 424 forms a second cartridge bearing receiving opening 440 for receiving a second cartridge bearing 444 therein. First cartridge bearing 436 and second cartridge bearing 444 are rotatably supported on opposite ends of the T-shaped piston shaft 408.

Second control interface portion 416 likewise includes parallel and arcuate first and second shaft mounting claws 448 and 452 that form a substantially vertically-oriented slot 456 therebetween and having sufficient width to receive hydraulic cylinder 400 therein. First shaft mounting claw 448 forms a first cartridge bearing receiving recess (not shown, but similar to first cartridge bearing receiving recess 432) for receiving an annular first bushing 460 therein, and second shaft mounting claw 452 forms a second cartridge bearing receiving opening (not shown, but similar to second cartridge bearing receiving opening 440) for receiving an annular second bushing (not shown, but similar to first bushing 460) therein. First bushing 460 is mounted to a first mounting shaft 464 that extends from the side of hydraulic cylinder 400, and the second bushing is similarly mounted to a second mounting shaft (not shown) extending from the opposite side of hydraulic cylinder 400.

In this embodiment, a bias communicating member 470 is structured and dimensioned to be mounted within a vertical mounting groove 474 formed in first brake arm mounting portion 42' of first brake arm 34'. In this embodiment, first pivot axis X1 intersects mounting groove 474 so that bias communicating member 470 pivots around a bias communicating member pivot axis B that is coaxial with first pivot axis X1. Bias communicating member 470 comprises a bias communicating member mounting portion 478, an axially thin, rod-shaped first brake arm interface portion 482, and a second brake arm interface portion 486, wherein bias communicating member mounting portion 478 is disposed between first brake arm interface portion 482 and second brake arm interface portion 486. As a result, first brake arm interface portion 482 is disposed between first brake arm mounting portion 42' and first brake pad mounting portion 46 of first brake arm 34' when bias communicating member 470 is mounted in mounting groove 474. Bias communicating member mounting portion 478 is formed as a generally annular member having an opening 490 dimensioned to receive first arm mounting portion 150 (FIG. 4) of first bushing 94 therethrough. Second brake arm interface portion 486 is formed as an axially thick paddle cam for engaging a thin rod-shaped cam follower 494 mounted to second brake arm 38' between second brake arm mounting portion 54' and second control interface portion 416.

When hydraulic cylinder 400 extends piston shaft 408 to bias first brake arm 34' to rotate counterclockwise, the side of first brake arm 34' presses against first brake arm interface portion 482 of bias communicating member 470, and second brake arm interface portion 486 of bias communicating member 470 presses against cam follower 494 attached to second brake arm 38' to communicate biasing force from piston shaft 408 to second brake arm 38' and to synchronize the movement of first brake arm 34' and second brake arm 38'.

When hydraulic cylinder 400 retracts piston shaft 408 to bias second brake arm 38' to rotate counterclockwise, the counterclockwise rotation of second brake arm 38' is communicated to second brake arm interface portion 486 of bias communicating member 470 via cam follower 494, thereby causing bias communicating member 470 to rotate clockwise. The clockwise rotation of bias communicating member 470 is communicated to first brake arm 34' via first brake arm interface portion 482 of bias communicating member 470, thereby causing first brake arm 34' to rotate clockwise to move first brake pad 53 to the brake released position and to synchronize the movement of first brake arm 34' and second brake arm 38'.

The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. Thus, the scope of the invention should not be limited by the specific structures disclosed or the apparent initial focus or emphasis on a particular structure or feature.

What is claimed is:

1. A bicycle brake apparatus comprising:
a first brake arm including:
a first brake arm mounting portion for mounting the first brake arm to a bicycle frame member;
a first brake pad mounting portion; and
a first control interface portion;
a second brake arm including:
a second brake arm mounting portion for mounting the second brake arm to the bicycle frame member;
a second brake pad mounting portion; and
a second control interface portion;
a biasing member operatively coupled to the first brake arm so that the first brake pad mounting portion is biased in a selected direction; and
a bias communicating member operatively coupled between the first brake arm and the second brake arm to communicate biasing force from the biasing member to the second brake arm.

2. The apparatus according to claim 1 wherein the second brake arm is unbiased except for the biasing force from the bias communicating member.

3. The apparatus according to claim 1 wherein the biasing member comprises a coil spring.

4. The apparatus according to claim 1 wherein the biasing member comprises a piston.

5. The apparatus according to claim 1 wherein the bias communicating member communicates movement between the first brake arm and the second brake arm so that the first brake arm moves synchronously with the second brake arm.

6. The apparatus according to claim 1 wherein the first brake arm mounting portion is disposed between the first brake pad mounting portion and the first control interface portion, and wherein the second brake arm mounting portion is disposed between the second brake pad mounting portion and the second control interface portion.

7. The apparatus according to claim 1 wherein the bias communicating member is mounted to the second brake arm.

8. The apparatus according to claim 1 wherein the second brake arm includes a passage to receive the first brake arm therethrough when the first brake arm and the second brake arm are mounted to the bicycle frame member.

9. The apparatus according to claim 1 wherein the first brake arm mounting portion is adapted to mount to the bicycle frame member for pivoting around a first pivot axis, and wherein the second brake arm mounting portion is adapted to mount to the bicycle frame member for pivoting around a second pivot axis.

10. The apparatus according to claim 9 wherein the bias communicating member is structured to be mounted for pivoting around a bias communicating member pivot axis.

11. The apparatus according to claim 10 wherein the bias communicating member comprises:
a bias communicating member mounting portion;
a first brake arm interface portion; and
a second brake arm interface portion.

12. The apparatus according to claim 11 wherein the bias communicating member mounting portion is disposed between the first brake arm interface portion and the second brake arm interface portion.

13. The apparatus according to claim 12 wherein the second brake arm includes a mounting groove, wherein the second pivot axis intersects the mounting groove, and wherein the bias communicating member is dimensioned to be mounted within the mounting groove for pivoting around the second pivot axis.

14. The apparatus according to claim 12 wherein the first brake arm interface portion has a first brake arm interface end, wherein the second brake arm interface portion has a second brake arm interface end, and wherein a distance from the bias communicating member pivot axis to the first brake arm interface end is greater than a distance from the bias communicating member pivot axis to the second brake arm interface end.

15. The apparatus according to claim 12 further comprising a movement interface member structured to be mounted between the first brake arm and the first brake arm interface portion.

16. The apparatus according to claim 12 further comprising an adjustment member that adjusts a relative position between the second brake arm and the second brake arm interface portion.

17. The apparatus according to claim 16 wherein the second brake arm includes a mounting groove, wherein the second pivot axis intersects the mounting groove, and wherein the bias communicating member is dimensioned to be mounted within the mounting groove for pivoting around the second pivot axis.

18. The apparatus according to claim 17 wherein the adjustment member is disposed at the second brake arm.

19. The apparatus according to claim 18 wherein the second brake arm interface portion is disposed between the second brake arm mounting portion and the second brake pad mounting portion.

20. The apparatus according to claim 19 wherein the adjustment member is disposed between the second brake arm mounting portion and the second brake pad mounting portion for engaging the second brake arm interface portion.

* * * * *